United States Patent [19]

Maunand

[11] Patent Number: 4,819,352
[45] Date of Patent: Apr. 11, 1989

[54] DOSAGE CALENDAR

[75] Inventor: Jean Maunand, Gevrey Chambertin, France

[73] Assignee: Fournier Innovation et Synergie, Paris, France

[21] Appl. No.: 155,828

[22] Filed: Feb. 16, 1988

[30] Foreign Application Priority Data

Feb. 13, 1987 [FR] France ................ 87 01814

[51] Int. Cl.⁴ .................................. G09D 3/00
[52] U.S. Cl. ............................... 40/107; 40/110
[58] Field of Search ............ 40/107, 110, 121; 283/2, 3, 102

[56] References Cited

U.S. PATENT DOCUMENTS

| | | | |
|---|---|---|---|
| 734,991 | 7/1903 | Sterki | 40/107 |
| 2,179,168 | 11/1939 | Alexander | 283/102 |
| 2,833,064 | 5/1958 | Parker | 40/107 |
| 3,057,474 | 10/1958 | Stern et al. | 206/78 |
| 3,099,352 | 7/1963 | Aven | 40/107 |
| 3,757,441 | 9/1973 | Baustin . | |
| 3,964,196 | 6/1976 | Ureta . | |
| 4,282,824 | 8/1981 | Lafferty | 40/110 |
| 4,614,360 | 9/1986 | Sheehan et al. | 40/110 |

FOREIGN PATENT DOCUMENTS

| | | | |
|---|---|---|---|
| 21062 | 9/1914 | Denmark | 40/110 |
| 2922372 | 4/1980 | Fed. Rep. of Germany | 40/110 |
| 1521611 | 5/1968 | France . | |
| 2079250 | 1/1982 | United Kingdom . | |

Primary Examiner—Gene Mancene
Assistant Examiner—Michael Lynch
Attorney, Agent, or Firm—Holman & Stern

[57] ABSTRACT

The present invention relates to a dosage calendar comprising at least two time scales (2, 3), the units 21a, 21b ...) of the first scale (2) being the day in the month or week or else a fraction of a day in the month, week or day, and the second scale (3) having a number of unit elements (31a, 31b ...) with a value of seven or a multiple of seven, which is equal to or directly greater than the total number of unit doses of drug to be administered, according to whether or not this number is divisible by seven, at least one of the two said scales including a recognition mark which can be changed by the user during the treatment.

7 Claims, 2 Drawing Sheets

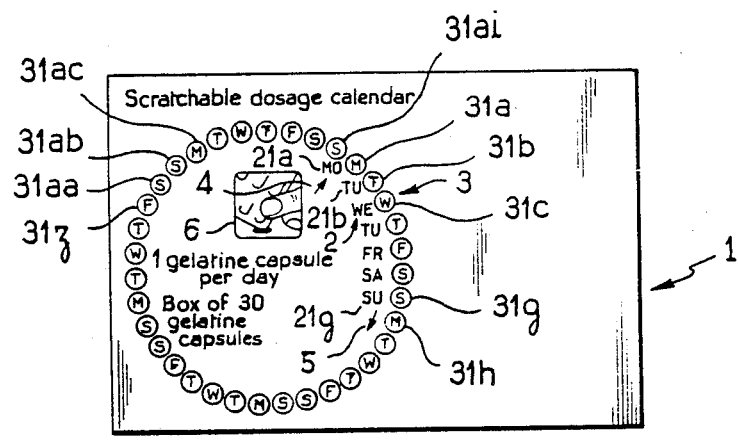
FIG_1
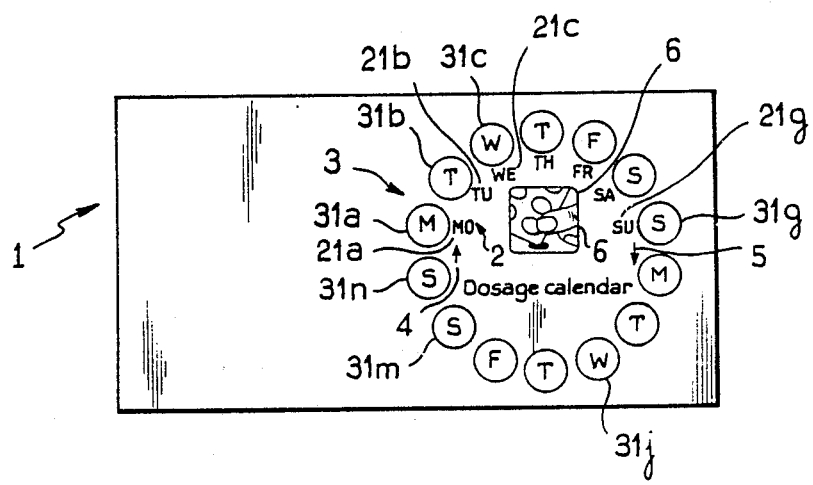
FIG_2

DOSAGE CALENDAR

The object of the present invention is to contribute to the success of a therapeutic treatment comprising several doses over a period of time. The invention relates more precisely, by way of a novel industrial product, to a dosage calendar which makes it possible to confirm that a proprietary medicinal product has actually been taken and to adhere over a period of time to the therapeutic treatment prescribed by the practitioner.

Types of packaging for proprietary medicinal products are known in which the blisters on a strip, sealed by a membrane or film which breaks open under pressure, each contain a unit dose, essentially for oral administration (a tablet, gelatin capsule or pill) or, if strictly necessary, for rectal or vaginal administration (a suppository or pessary).

Some of these so-called blister packs are known to contain strips which include calendar information for all the blisters, i.e. the names of the days of the week, or their abbreviations, for the duration of the treatment. These calendar strips, which are essentially used for the presentation of "contraceptive pills" containing oral contraceptive steroids, are not suitable for treatments whose duration does not correspond to a whole multiple of a week.

In practice, for reasons of safety and economy, for a treatment which involves taking one tablet per day for 30 days, nobody is going to market calendar strips of the above-mentioned type which contain 35 tablets distributed one to a blister, the name of a day of the week being associated with each blister.

Furthermore, these calendar strips are only applicable to a restricted number of pharmaceutical forms, i.e. essentially the solid oral forms such as tablets, gelatin capsules and pills.

Finally, to use the experts' expression, these strips do not effectively provide a "dosage aid" for the therapeutic treatment because (i) the opening of a blister, carrying calendar information, by breaking the protective membrane, and (ii) the removal of the contents (in the case in question, the tablet, gelatin capsule or pill) from the said blister, may not correspond to the actual administration of the drug. An unfortunate circumstance of this kind can arise especially when the patient fills his pill box in the morning and forgets one of the doses during the day.

According to the invention, a novel technical solution is recommended for solving the problem of the "dosage aid" for a therapeutic treatment, which makes it possible to overcome he above-mentioned difficulties and which has the advantage of being applicable not just to solid oral forms but to all pharmaceutical forms, irrespective of their packaging and their mode of administration. Briefly, the technical solution which is recommended is suitable for solid oral forms and for other forms, especially liquid oral forms such as syrups and ampoules to be taken orally, and dermatological forms such as ointments, salves, milks and lotions.

Compared with the prior art described above, the solution according to the invention is distinguished in particular by separating the two important operations, i.e. on the one hand the removal of the dose from its container (blister strip, bottle, tube, etc.) and on the other hand the actual administration of the said dose.

According to the invention, therefore, a dosage calendar is proposed which makes it possible to contribute to the success of and compliance with a therapeutic treatment by confirming that a drug has actually been administered and adhering to the prescribed dosage over a period of time, the said calendar, which includes calendar information, having the following features:

(a) it comprises at least two series of calendar information, the first series consisting of the chronological sequence of all the unit elements of a time group, the said elements being selected as a function of the periodicity of administration of the unit dose of the drug according to a scale comprising:
  (i) the numbers of the days when the time group is a month,
  (ii) the names of the days, or their abbreviations, when the time group is a week, and
  (iii) the fractions or portions of a day when the time group is a day, week or month, and the second series consisting of the chronological sequence of all the unit elements of a time group of weekly character according to a scale based on seven, the number of unit elements in the said group having a value of seven or a whole multiple of seven and being equal to or directly greater than the total number of unit doses of drug which are to be administered, according to whether or not this number is divisible by seven, (b) the calendar information in at least one of the two said series has in each case a recognition mark which can be changed by the user during the treatment, and (c) the two said series of calendar information being associated and cooperating in such a way that, by virtue of the recognition marks, the start of the treatment, the last unit dose administered and the next unit dose to be taken are specified, during the treatment, by visual or manual reading of the said dosage calendar.

Briefly, the dosage calendar according to the invention includes two time scales, the units of the first scale being the day in the month or week or else a portion of a day in the day, week or month, and the second scale, of weekly character, being based on seven or a whole multiple of seven.

These two scales, which are interchangeable and can also have unit elements in common, make it possible to identify three moments in time by virtue of the recognition marks or signs: the start of the treatment, the time of the last dose and the time of the next dose.

The preferred recognition mark or sign according to the invention can be detected either visually or by touch, so that the non-sighted can use the present dosage calendar without difficulty. This type of recognition mark is advantageously a scratchable layer of ink placed over an appropriate area in accordance with at least one of the two time scales. The removal of a layer of ink by scratching can be identified on the one hand by a difference in the color of the underlying area, and on the other hand by a difference in the thickness to the touch.

The dosage calendar according to the invention is particularly valuable for treatment cycles comprising a period of administration of a drug followed by a rest period with no administration.

In the present case, the unit dose of drug referred to above is the smallest dose which can be administered, as recommended by the manufacturer. Advantageously, the unit dose will correspond to the daily dose to be administered, as prepared or recommended by the said manufacturer.

Further advantages and characteristics of the invention will be understood more clearly from the following description of embodiments, which in no way imply a limitation but are given by way of illustration, by reference to the attached drawings, in which:

FIG. 1 schematically represents a calendar according to the invention which is intended for a dosage schedule comprising one unit dose per day for thirty days;

FIG. 2 represents another calendar according to the invention which is intended for a dosage schedule comprising one unit dose per day for two weeks;

Figure 3:
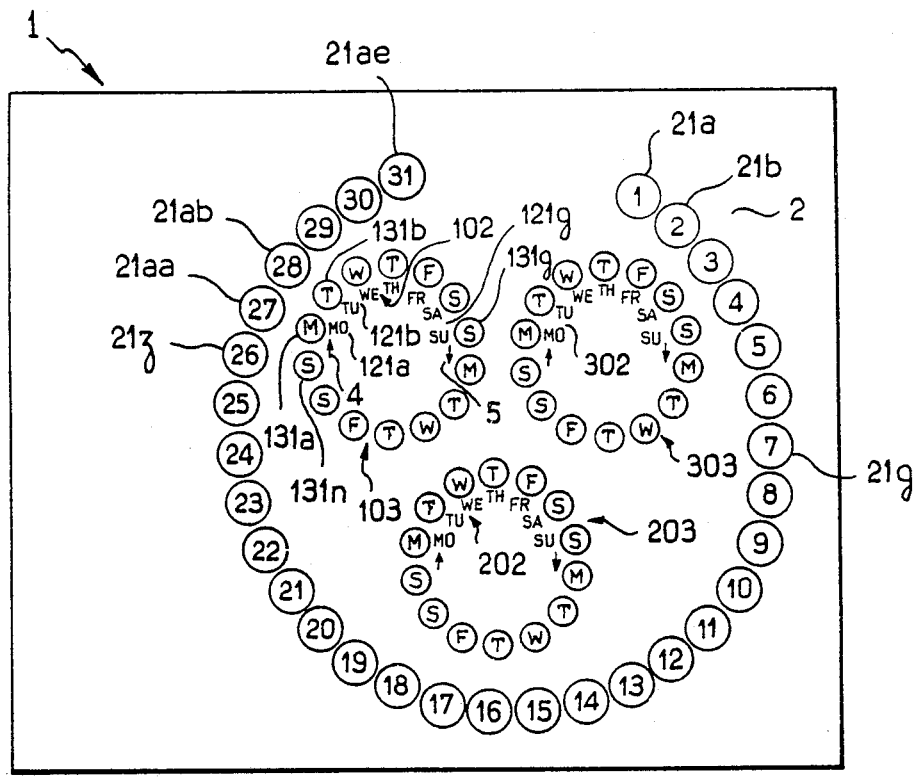
FIG. 3 represents another calendar according to the invention which is intended for a dosage schedule comprising several successive cycles with a period of administration followed by a rest period in each cycle.

The dosage calendar according to the invention, which has the reference number 1, is presented either in the form of a card placed inside the packing box, or in the form of a printed piece of paper affixed to one of the outer faces of the packing box, or else in the form of a detachable self-adhesive label to be stuck onto the packing box. Advantageously, provision can be made for the packing box to carry both the said card and the said printed paper on one of its faces, it then being possible for the patient to take the card with him when he goes away.

The dosage calendar 1 has a first series 2 of calendar information 21a, 21b . . . 21g—the seven days of the week in the case in question—and a second series 3 of calendar information 31a, 31b, etc. (thirty-five symbols according to FIG. 1, numbered 31a to 31ai, and fourteen symbols according to FIGS. 2–4, numbered 31a to 31n). The number N of symbols in the second series corresponds to the total number D of unit doses contained in the packing box if D is divisible by seven, or is equal to seven or to the multiple of seven which is directly greater than D if D is not divisible by seven.

In practice, N will have a value of 7, 14, 21, 28 or 35. In the case in question in FIG. 1, the total number D of unit doses is 30 (1 gelatin capsule per day for 30 days), so the number N is 35.

Advantageously, at least one of the two calendar series 2 and 3 is presented in the form of a ring, which is the series 3 in the case in question. The symbols 31a, 31b, etc. in the said series are scratchable ink patches, that portion of the surface of the calendar 1 which is located underneath the said patch having a different color from the scratchable layer of ink. The thickness of the said scratchable layer of ink can be detected by touch. A calendar symbol can appear on top of the layer of each patch or alternatively underneath the said layer. For practical reasons, the calendar symbol can be put "in reserve", i.e. it is located on the calendar 1 in the area underneath the scratchable ink patch, but is not covered with a layer of ink, the said symbol thereby being rendered visible before scratching.

At the start of the treatment, the user scratches one of the scratchable ink patches 31a, 31b . . . 31g situated opposite the calendar symbol 21a, 21b . . . 21g corresponding to the day of the week, starting from the arrow 4, and then scratches the next calendar symbol in the series 3, in the direction of the arrow 5, when the next unit dose is administered, this same operation being carried out until the unit doses in the packing box have been exhausted.

The calendar 1 according to the invention can also carry a diagram in an inset 6, showing how to use the calendar.

FIG. 2 represents a dosage calendar relating to a treatment comprising 1 unit dose per day for 2 weeks, which is used as indicated above.

A calendar analogous to that of FIG. 2 can be useful for a treatment comprising one unit dose in the morning and evening for one week. In this case, the calendar information 21a and 21b would relate, for example, to the morning and evening of the same day of the week, and the calendar information 31a and 31b could be represented by M1 and M2 in order to denote respectively the first and second administrations on Monday.

The calendar of FIG. 3 is intended for a dosage schedule comprising 3 successive cycles, each cycle involving, for example, the administration of one unit dose per day for 10 days, followed by a rest period of 20–21 days with no administration. On the first day of the treatment, the patient scratches the patch 21a-21b . . . 21ae corresponding to the number of the day in the month, and one of the patches 131a to 131g in the series 103 located opposite the series 102, and then scratches the next patch each day for the 10 days of administration. He starts the cyclic treatment again on that day of the next month which has the same number as that of the first cycle, and scratches the patches of the series 203 which are homologous to those of the series 103, initially making use of the information in the series 202, this procedure continuing for the 10 days of daily administrations. After the rest period of 20–21 days, the third cycle proceeds in the same way as the first two with scratching of the patches of the series 303, initially making use of the information in the series 302. Briefly, a calendar of this type includes, for an administration/rest treatment, at least one first series 2 of calendar information and a pair consisting of a new first series 102 of calendar information 121a, 121b . . . and a second series 103 of calendar information 131a, 131b . . . , at the rate of one pair 102, 103 per dosage cycle comprising a period of administration and a rest period with no administration.

Figure 4:
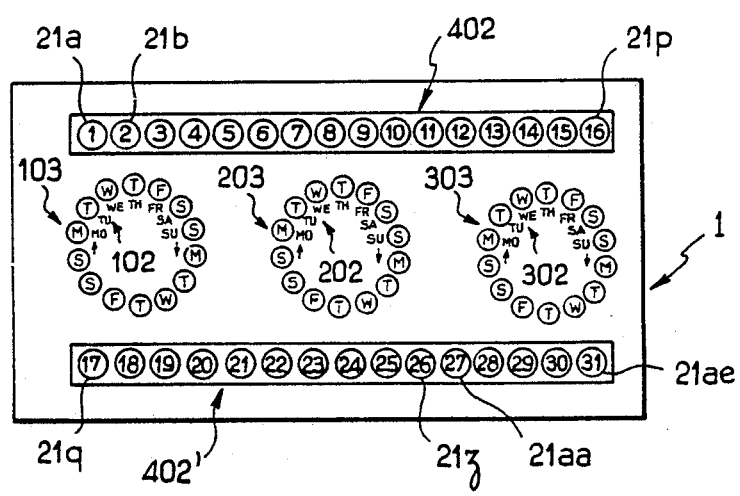
FIG. 4 represents another embodiment of a dosage calendar for a dosage schedule comprising several successive cycles as in FIG. 3.

The dosage calendar of FIG. 4 is analogous to that of FIG. 3, the series 402, 402', which corresponds to the series 2 of FIG. 3, being arranged as two rectangular strips rather than in the form of a ring.

As a variant, for a dosage schedule analogous to that of FIGS. 3 and 4, provision can be made to replace the series 2 and 402, 402' with an inset in which the patient writes the date when the treatment starts.

What is claimed is:

1. A dosage calendar for facilitating the success of and compliance with a therapeutic drug treatment by aiding in confirming that a drug has actually been administered and in adhering to a prescribed dosage over a period of time, said calendar comprising:

at least two series of calendar indicia, including:

a first series (2) of calendar indicia consisting of a chronological sequence of first unit elements (21a, 21b . . . ) of a first time group, said first unit elements (21a, 21b . . . ) corresponding in number to the periodicity of administration of a unit dose of a drug such that said first unit elements represent (i) numbers of the days of the month when the first time group is a month, and (ii) names of the days of the week, or their abbreviations, when the first time group is a week, and (iii) portions of a day when the first time group is a day, week or month and the periodicity of administration is greater than one unit dose per day, and a second series (3) of calendar indicia consisting of a chronological sequence of second unit elements (31a, 31b . . . ) of a second time group of at least one week, the number of second unit elements in said second time group being seven or a whole multiple of seven and being equal to or just greater than a total number of unit doses of the drug which are to be administered, according to whether or not said total number of unit doses is divisible by seven, the calendar indicia of at least one of said first and second series (2, 3) of indicia each having a manually user-changeable recognition mark for recording thereon each prescribed administration and prescribed non-administration of a unit does corresponding with a respective one of said unit elements, said first and second series (2, 3) of calendar indicia corresponding with one another such that, by the changing of respective ones of said recognition marks at the time of prescribed administration or prescribed non-administration of each unit dose of the drug, the respective unit elements of said first and second time groups corresponding to the start of the treatment, the last unit dose administered and the next unit dose to be administered are made recognizable, during treatment, by visual or manual reading of said dosage calendar.

2. The dosage calendar as claimed in claim 1, wherein at least one of said first and second series of calendar indicia (2, 3) is arranged in a ring.

3. The dosage calendar as claimed in claim 1, wherein the recognition mark can be detected visually and by touch.

4. The dosage calendar as claimed in claim 3, wherein the recognition mark is a scratchable layer of ink (31a, 31b . . . ).

5. The dosage calendar as claimed in claim 4, wherein the scratchable layer of ink is a patch covering an underlying area situated around a second unit element (31a, 31b . . . ), without covering said second unit element.

6. The dosage calendar as claimed in claim 1, wherein said calendar has at least one said first series (2) of calendar indicia and a pair of series of calendar indicia consisting of a further first series (102) of calendar indicia (121]a, 121b . . . ) and one of said second series (103) of calendar indicia (131a, 131b . . . ), with one said pair (102–103) of series of calendar indicia per dosage cycle where a dosage cycle consists of a prescribed period of administration of the drug and a prescribed rest period of non-administration of the drug.

7. The dosage calendar as claimed in claim 1, wherein the unit dose is a daily dose and wherein the first series (2) of calendar indicia (21a, 21b . . . 21g) has, as first unit elements thereof, a sequence of names of the seven days of the week, or their abbreviations, the first time group being a week.

* * * * *